United States Patent [19]

Boeder

[11] 4,316,000

[45] Feb. 16, 1982

[54] TWO-PART, ANAEROBICALLY-CURING COMPOSITIONS

[75] Inventor: Charles W. Boeder, St. Paul, Minn.

[73] Assignee: Minnesota Mining and Manufacturing Company, St. Paul, Minn.

[21] Appl. No.: 203,685

[22] Filed: Nov. 3, 1980

[51] Int. Cl.³ .................. C08F 20/10; C08F 20/20
[52] U.S. Cl. ............................... 526/301; 428/522; 526/220; 526/309; 526/313; 526/317; 526/320; 526/323.1; 526/323.2
[58] Field of Search ............... 526/323.1, 323.2, 313, 526/309, 320, 317, 301, 220

Primary Examiner—Harry Wong, Jr.
Attorney, Agent, or Firm—Cruzan Alexander; Donald M. Sell; Walter N. Kirn, Jr.

[57] ABSTRACT

Anaerobically-curing compositions are described comprising a first part and a second part with at least one of said first part and said second part comprising as a major constituent a polymerizable monomer having at least one $\alpha,\beta$-unsaturated carboxyl functionality per molecule of monomer, and with said first part comprising as a first initiator component a perfluoroalkyl sulfonanilide and said second part comprising as a second initiator component a secondary or tertiary aromatic amine.

10 Claims, No Drawings

TWO-PART, ANAEROBICALLY-CURING COMPOSITIONS

BACKGROUND OF THE INVENTION

This invention relates to anaerobically-curing compositions and to methods of employing the same.

Two-part, anaerobically-curing compositions are often desirable for many bonding operations such as the situation in which only inactive substrates (e.g., inactive metal substrates such as zinc and cadmium and nonmetallic substrates such as plastic, glass and wood) are involved in the bonding operation. In order to obtain suitable shelf-lives in one-part, anaerobically-curing compositions, such compositions commonly contain polymerization inhibitors as well as lesser amounts of polymerization initiators as compared to two-part compositions. This may result in compromised rates of cure which are particularly evident when the compositions are employed on inactive substrates.

Two-part, anaerobically-curing compositions containing peroxy initiators are well-known in the art. However, those compositions suffer from the disadvantage that in their manufacture one encounters the possibility of explosion when handling large amounts of the peroxy compounds. Furthermore, unfortunately peroxy compounds typically decompose with time, thereby resulting in a steadily decreasing ability of such compounds to initiate polymerization of the compositions containing them.

U.S. Pat. No. 3,658,624 (Lees) describes two-part anaerobically-curing compositions which exhibit suitable cure-rates on inactive surfaces. However, saccharin (o-benzoic sulfimide), which is described therein as a preferred accelerator (i.e., initiator) moiety, is rather insoluble in polymerizable acrylate or methacrylate monomers and therefore renders manufacture of these compositions inconvenient.

BRIEF SUMMARY OF THE PRESENT INVENTION

The present invention provides novel anaerobically-curing compositions comprising a first part and a second part, with at least one of said first part and said second part comprising as a major constituent a polymerizable monomer having at least one $\alpha,\beta$-unsaturated carboxyl functionality per molecule of monomer, and with said first part comprising as a first initiator component a perfluoroalkyl sulfonanilide and said second part comprising as a second initiator component a secondary or tertiary aromatic amine.

The present invention provides two-part, anaerobically-curing compositions which exhibit adhesive and/or sealant properties. These compositions, as the result of inclusion of both a compound selected from the class of perfluoroalkyl sulfonanildes and an aromatic amine, exhibit a rapid rate of cure in the absence of oxygen when employed on either active or inactive substrates and therefore are useful in a variety of bonding and sealing operations. Manufacture of these compositions is accomplished conveniently and there is no possibility of explosion during their manufacture in contrast to peroxide or hydroperoxide-containing compositions. Being two-part compositions, the compositions of the present invention furthermore exhibit extended shelf-life and do not suffer from the problem associated with the gradual decomposition of peroxide or hydroperoxide initiators.

DETAILED DESCRIPTION OF THE PRESENT INVENTION

The compositions of the present invention comprise a polymerizable monomer having at least one $\alpha,\beta$-unsaturated carboxyl functionality

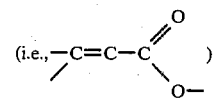

per molecule of monomer. suitable monomers include the diacrylates and dimethacrylates described in U.S. Pat. Nos. 3,043,820 (Krieble), 3,457,212 (Fukuoda et al.), 3,923,737 (George et al.), and 3,944,521 (Bradley et al.), incorporated herein by reference. Other suitable monomers include acrylate-terminated monomers such as the monomeric polyacrylate esters formed from organic polyisocyanates, such monomers being described, for example, in U.S. Pat. No. 3,425,988 (Gorman et al.), incorporated herein by reference. Particularly suitable polyfunctional acrylates and methacrylates include triethyleneglycol dimethacrylate, ethyleneglycol dimethacrylate, tetraethyleneglycol dimethacrylate, polyethylene glycol diacrylate, polyethyleneglycol dimethacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate and bisphenol A bis(2-hydroxypropyl)dimethacrylate.

Monoacrylates and monomethacrylates are also suitable for employment in the compositions of the present invention. Suitable monoacrylates and monomethacrylates include cyclohexyl methacrylate, 2-ethylhexyl methacrylate, hydroxyethyl methacrylate, isooctyl acrylate and n-butyl acrylate.

Methacrylic acid and other $\alpha,\beta$-unsaturated carboxylic acids are also suitable for employment as polymerizable monomers in the compositions of the present invention as are half-esters such as the 2-hydroxyethyl methacrylate half-ester of maleic acid. Other suitable half-esters include those described in U.S. Pat. No. 3,428,614 (Brownstein) and 4,080,238 (Wolinski et al.) incorporated herein by reference.

In order to enhance the shelf-life of the compositions of the present invention it may be desirable to remove metal ions, if such are present, from the polymerizable monomer. This may be particularly desirable in the event that commercially-obtained monomers, which often contain significant amounts of metal ions, are employed in these compositions. Removal of metal ions may be effected, for example, by means of prior treatment of the monomer with a complexing agent such as the tetrasodium salt of N,N,N',N'-ethylenediamine tetraacetic acid. Such treatment has been described in U.S. Pat. No. 4,038,475 (Frauenglass et al.), incorporated herein by reference.

Suitable perfluoroalkyl sulfonanilides for use as the first initiator component in the compositions of the present invention have been described in U.S. Pat. Nos. 4,005,141 (Moore et al.) and 4,076,519 (Harrington et al.), incorporated herein by reference, and include trifluoromethanesulfonanilide, 2-phenyltrifluoromethane sulfonanilide and N-2-naphthyltrifluoromethylsulfonanilide, all prepared in a closed reactor as described generally in Method A of said U.S. Pat. No. 4,005,141; 4-trifluoromethyltrifluoromethanesulfonanilide, prepared as described in said U.S. Pat. No. 4,076,519; and 4-phenylthiotrifluoromethanesulfonanilide, prepared as described in said U.S. Pat. No. 4,005,141. Trifluoromethanesulfonanilide is the preferred perfluoroalkylsulfonanilide for employment in the compositions of the present invention. The compositions of the present invention may comprise a single type of a perfluoroalkylsulfonanilide or may comprise two or more different perfluoroalkylsulfonanilides.

It is unexpected that perfluoroalkylsulfonanilides will, in the presence of an amine, initiate cure of the compositions of the present invention since the corresponding alkyl sulfonanilides generally fail to provide a suitable cure. For example, while the abovementioned N-2-naphthyltrifluoromethylsulfonanilide imparts a suitable cure to the compositions of the present invention, N-2-naphthylmethylsulfonanilide fails to impart a suitable cure.

Suitable amines for use as the second initiator component are secondary or tertiary aromatic amines. Examples of suitable secondary and tertiary aromatic amines are described in U.S. Pat. No. 3,682,875 (O'Sullivan et al.), incorporated herein by reference. Particularly suitable tertiary aromatic amines are N,N-dimethyl-p-toluidine, N,N-diethyl-p-toluidine, N,N-dimethylaniline and N,N-bis-(2-hydroxyethyl)-p-toluidine. A particularly suitable secondary aromatic amine is 1,2,3,4,-tetrahydroquinoline. While other secondary aromatic amines will, in the presence of a sulfonanilide, generally initiate a cure, the above-listed tertiary amines and secondary amine are preferred since faster cures will typically result. The compositions of the present invention may comprise a single type of amine or may comprise a mixture of two or more different amines.

The two-part compositions of the present invention may comprise two monomer parts with one monomer part comprising a sulfonanilide and the other monomer part comprising an aromatic amine. The two monomer parts may comprise either the same monomer in each or may comprise different monomers from one another. Also, mixtures of various monomers may be employed in any given monomer part.

Alternatively, one part of the two-part compositions of the present invention may comprise a polymerizable monomer and an initiator component (i.e., either a perfluoroalkyl sulfonanilide or aromatic amine), while the other part may simply comprise the complementary initiator component (i.e., either a perfluoroalkyl sulfonanilide or aromatic amine depending on the initiator component employed in the aforementioned monomer part) in combination with a suitable vehicle such as a volatile organic solvent. Since the preferred aromatic amines described herein are liquids at room temperature, one part of the two-part compositions of the present invention may simply comprise a preferred amine as a neat liquid.

The amounts of the sulfonanilide and aromatic amine initiator components employed in the compositions of the present invention may vary to some extent depending on cure-rate considerations. It has been found in the present invention that from about 0.1 to 20 parts by weight and preferably 0.5 to 5 parts by weight of a sulfonanilide and about 0.05 to 20 parts by weight and preferably 0.2 to 5 parts by weight of an aromatic amine, both per 100 parts by weight of the total monomer present in the composition, will provide compositions exhibiting suitable cure-rates on a variety of substrates.

When bonding substrates, one of the parts of a composition of the present invention is simply applied to the surface of one substrate and the other part is applied to either the same surface or is applied to the surface of the other substrate. In the event that the two parts of the composition are applied to the same surface, one should proceed quickly with the bonding operation. However, when each part is applied to the surface of a different substrate, these substrates may be individually stored for prolonged periods, if such is desired, prior to bonding. In either situation, the surfaces are simply brought into abutting relation when it is desired to form the bond. Fixturing (i.e., clamping) of the substrates may be necessary until polymerization of the composition has occurred to provide sufficient bond strength between the substrates.

At least one of the parts of the two-part compositions of the present invention may further comprise modifying polymers in order to obtain desired bonding properties.

Modifying polymers which may be present in these compositions include polymers added to obtain desired viscosities. Other modifying polymers which may be present in these compositions include thermoplastic polymers and pressure-sensitive polymers, the latter also generally being thermoplastic in nature. Preferred modifying polymers are substantially nonreactive (i.e., will not generally be subject to free-radical-initiated polymerization under the anaerobic conditions typically used to cure the compositions of the present invention).

Polymers useful as modifying polymers for providing compositions exhibiting increased viscosities are well-known in the art and include cellulose acetate butyrates, polymethacrylates, phenoxy resins, polyesters and polyurethanes. A preferred modifying polymer for increasing viscosities of these compositions is "PKHA Resin" (a phenoxy resin commercially available from Union Carbide).

Thermoplastic polymers useful as modifying polymers in these compositions are well-known in the art and include those described in U.S. Pat. No. 3,996,308 (Douek et al.), incorporated herein by reference. Examples of particularly suitable thermoplastic polymers include polyvinyl acetates (e.g. that available under the trade designation "AYAT Resin" from Union Carbide), phenoxy resins (e.g., that available under the trade designation "PKHJ Resin" from Union Carbide), polyesters (e.g. that available under the trade designation "Vitel 207" from B. F. Goodrich), polyurethanes (e.g., that available under the trade designation "Estane 5712" from B. F. Goodrich), and nitrile rubbers (e.g., that available under the trade designation "Hycar 1072" from B. F. Goodrich).

Pressure-sensitive polymers useful as modifying polymers in these compositions include those described in U.S. Pat. No. Re. 24,906 (Ulrich) and U.S. Pat. No. 4,113,792 (Pastor et al.), both incorporated herein by reference. Examples are particularly suitable pressure-sensitive polymers include copolymers of isooctyl acrylate and acrylic acid, copolymers of isobutyl acrylate and acrylic acid and copolymers of n-butylacrylate and acrylic acid, those copolymers preferably containing about 90% by weight of the respective alkyl acrylate and about 10% by weight of acrylic acid.

It is also understood that the compositions of the present invention may further comprise various other ingredients such as fillers, thickening agents, and the like which are well-known in the art.

In the following examples, which will serve to illustrate the present invention, all parts are parts by weight and all percentages are given as percentages by weight, unless otherwise indicated.

EXAMPLE 1

A suitable two-part, anaerobically-curing composition is obtained by preparing the following Solutions 1 and 2:

|  | Parts by Weight |
| --- | --- |
| Solution 1 | |
| N,N-dimethyl-p-toluidine | 10 |
| Triethyleneglycol dimethacrylate (available under the trade designation "SR-205" from Sartomer Co.) | 90 |
| Solution 2 | |
| Trifluoromethanesulfonanilide | 5 |
| Triethyleneglycol dimethacrylate | 95 |

Performance of the above composition is tested by bonding 1 inch by 4 inch (2.5 cm × 10.2 cm) samples of substrates to one another. Solutions 1 and 2 are each applied to a different one of like substrates in the amount of approximately 0.1 cc of a given solution per square inch area of a substrate. The substrates are subsequently brought into contact with one another and clamped. When the above composition is tested in this manner (designated Test A), the time needed to obtain handling time (that is the time required to develop a bond between the surfaces such that clamping is no longer required to maintain the bond) is as indicated in Table I for the various types of substrates listed:

TABLE I

| Substrates | Handling Time (minutes) |
| --- | --- |
| Glass | 15 |
| Polyvinyl chloride | 25 |
| Aluminum | 15 |
| Steel | 10 |

In further testing the performance of the above composition, one drop (about 0.05 cc) of Solution 2 is applied to a ⅜ inch (0.95 cm) No. 16 bolt and an equal volume of Solution 1 is applied to a mating nut (of like metal) which is then placed on the bolt. When tested in this manner, the fixture time (i.e., the time at which the nut could no longer be unscrewed from the bolt using hand strength only) and break away torque (measured after maintaining at room temperature for 24 hours) for nuts and bolts comprising various metals are as listed in Table II.

TABLE II

| Metal | Fixture time (minutes) | Break away torque (inch/pounds) |
| --- | --- | --- |
| Plain steel | 10 | 100 (680 cm/kg) |
| Cadmium | 15 | — |
| Zinc | 30 | 70 (476 cm/kg) |

EXAMPLE 2

Another suitable two-part anaerobically-curing composition is prepared from the following Solutions 3 and 4:

|  | Parts by Weight |
| --- | --- |
| Solution 3 | |
| N,N-dimethyl-p-toluidine | 10 |
| Triethyleneglycol dimethacrylate | 90 |
| Solution 4 | |
| N-2-naphthyltrifluoromethylsulfonanilide | 5 |
| Triethyleneglycol dimethacrylate | 95 |

When the above composition is tested in accordance with Test A of Example 1, the handling time is less than about 10 minutes.

EXAMPLE 3

Another suitable two-part, anaerobically-curing composition is prepared from the following Solutions 5 and 6:

|  | Parts by Weight |
| --- | --- |
| Solution 5 | |
| N,N-dimethyl-p-toluidine | 10 |
| Triethyleneglycol dimethacrylate | 90 |
| Solution 6 | |
| 4-phenylthiotrifluoromethanesulfonanilide | 5 |
| Triethyleneglycol dimethacrylate | 95 |

When the above composition is tested in accordance with Test A of Example 1, the handling time is less than about 10 minutes.

EXAMPLE 4

Another suitable two-part, anaerobically-curing composition is obtained by preparing the following Solutions 7 and 8:

|  | Parts by Weight |
| --- | --- |
| Solution 7 | |
| Trifluoromethanesulfonanilide | 4.75 |
| Hydroxyethyl methacrylate | 60 |
| "Uvithane 782" (acrylate-terminated urethane available from Thiokol) | 30 |
| Methacrylic acid | 5 |
| Solution 8 | |
| N,N-dimethyl-p-toluidine | 7 |
| Hydroxyethyl methacrylate | 60 |
| "Uvithane 782" | 30 |
| Methacrylic acid | 5 |

Solutions 3 and 4 are prepared by first mixing together the various monomers to obtain a homogeneous mixture followed by addition of either the sulfonanilide or the toluidine to each, respectively.

Performance of the above composition is tested in accordance with Test A of Example 1, with the time required to obtain handling strength indicated in Table III below. Table III also contains the overlap shear value obtained when steel substrates are bonded in accordance with Test A of Example 1. Here the bond is allowed to condition for 24 hours at room temperature, at which time the overlap shear value is determined using an Instrom Dynamic Tester with a jaw separation rate of 0.1 inch (0.25 cm) per minute.

TABLE III

| Surfaces | Handling Time (minutes) | Overlap Shear (pounds per square inch) |
|---|---|---|
| Aluminum | 15 | — |
| Steel | 10 | 490 |

EXAMPLE 5

Another suitable two-part, anaerobically-curing composition consists of Solution 1 of Example 1 as one part of the composition and neat N,N-dimethyl-p-toluidine as the other part.

When the above composition is tested on steel substrates in accordance with Test A of Example 1 using an appropriate amount of N,N-dimethyl-p-toluidine, the handling time is 5 minutes.

EXAMPLE 6

Another suitable two-part anaerobically-curing composition consists of Solution 7 of Example 4 as one part of the composition and neat N,N-dimethyl-p-toluidine as the other part.

When the above composition is tested on steel substrates in accordance with Test A of Example 1 using an appropriate amount of N,N-dimethyl-p-toluidine (about 0.01 cc per square inch of substrate), the handling time is 10 minutes.

EXAMPLE 7

In demonstrating the relative rates of solubility of perfluoroalkyl sulfonanilides and sulfimides, the following solutions were prepared with mild stirring at room temperature. The time require for complete solubilization is indicated in minutes unless otherwise indicated.

| Composition | | Time for Solubilization of Initiator Component (minutes) |
|---|---|---|
| Monomer | Initiator Component | |
| Triethylene glycol dimethacrylate (25 grams) | Saccharin (0.25 grams) | 20 |
| Triethyleneglycol dimethacrylate (25 grams) | Trifluoromethane sulfonanilide (1.25 grams) | 4 |
| Trimethylolpropane trimethacrylate (25 grams) | Saccharin (0.25 grams) | greater than 120 |
| Trimethylolpropane trimethacrylate (25 grams) | Trifluoromethane sulfonanilide (1.25 grams) | 5 |

As is apparent from the above solubility comparisons, trifluoromethane sulfonanilide dissolves much more rapidly in the two monomers than does saccharin.

What is claimed is:

1. An anaerobically-curing composition comprising a first part and a second part, with at least one of said first part and said second part comprising as a major constituent a polymerizable monomer having at least one $\alpha,\beta$-unsaturated carboxyl functionality per molecule of monomer, and with said first part comprising as a first initiator component a perfluoroalkyl sulfonanilide and said second part comprising as a second initiator component a secondary or tertiary aromatic amine.

2. The composition in accordance with claim 1, wherein said perfluoroalkyl sulfonanilide is present in about 0.1 to 20 parts by weight per 100 parts by weight of the total amount of said monomer in said composition and said aromatic amine is present in about 0.05 to 20 parts by weight per 100 parts by weight of the total amount of said monomer in said composition.

3. The composition in accordance with claim 1, wherein both said first part and said second part comprise as a major constituent said monomer.

4. The composition in accordance with claim 1, wherein one of said first part and said second part comprises a solution of either said perfluoroalkyl sulfonanilide or said aromatic amine in a suitable vehicle.

5. The composition in accordance with claim 1, wherein one of said first part and said second part consists essentially of said aromatic amine.

6. The composition in accordance with claim 1, wherein said monomer is selected from the group consisting of triethyleneglycol dimethacrylate, ethyleneglycol dimethacrylate, tetraethyleneglycol dimethacrylate, polyethyleneglycol dimethacrylate, polyethylene glycol diacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate, bisphenol A bis(2-hydroxypropyl)dimethacrylate, cyclohexyl methacrylate, 2-ethylhexyl methacrylate, hydroxyethyl methacrylate, isoctyl acrylate, n-butyl acrylate, methacrylic acid, the 2-hydroxyethyl methacrylate half-ester of maleic acid, and monomeric polyacrylate esters formed from isocyanates.

7. The composition in accordance with claim 1, wherein said perfluoroalkyl sulfonanilide is selected from the group consisting of trifluoromethanesulfonanilide, 4-trifluoromethyltrifluoromethanesulfonanilide, 2-phenyltrifluoromethanesulfonanilide, 4-phenylthiotrifluoromethanesulfonanilide and N-2-naphthyltrifluoromethylsulfonanilide.

8. The composition in accordance with claim 1, wherein said aromatic amine is selected from the group consisting of N,N-dimethyl-p-toluidine, N,N-diethyl-p-toluidine, N-N-dimethylaniline, N-N-bis-(2-hydroxyethyl)-p-toluidine, and 1,2,3,4-tetrahydroquinoline.

9. The composition in accordance with claim 1, wherein said perfluoroalkyl sulfonanilide is present in an amount of about 0.5 to 5 parts by weight per 100 parts by weight of the total amount of said monomer in said composition and said aromatic amine is present in an amount of about 0.2 to 5 parts by weight per 100 parts by weight of the total amount of said monomer in said composition.

10. The composition in accordance with claim 1, wherein said perfluoroalkyl sulfonanilide is trifluoromethane sulfonanilide and said aromatic amine is N,N-dimethyl-p-toluidine.

* * * * *